(12) United States Patent
Sun et al.

(10) Patent No.: US 6,732,264 B1
(45) Date of Patent: May 4, 2004

(54) MULTI-TASKING BOOT FIRMWARE

(75) Inventors: Jiming Sun, Portland, OR (US); Albert Tsang, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/461,161

(22) Filed: Dec. 14, 1999

(51) Int. Cl.[7] ............................................. G06F 9/445
(52) U.S. Cl. ......................................................... 713/2
(58) Field of Search .............................. 713/1, 2, 100

(56) References Cited

U.S. PATENT DOCUMENTS

| | | | | |
|---|---|---|---|---|
| 5,444,642 A | * | 8/1995 | Montgomery et al. | 702/91 |
| 6,138,234 A | * | 10/2000 | Lee et al. | 713/2 |
| 6,209,089 B1 | * | 3/2001 | Selitrennikoff et al. | 713/2 |
| 6,304,866 B1 | * | 10/2001 | Chow et al. | 707/2 |
| 6,304,891 B1 | * | 10/2001 | Anderson et al. | 709/107 |
| 6,385,668 B1 | * | 5/2002 | Gaddess et al. | 710/8 |
| 6,434,697 B1 | * | 8/2002 | Leyda et al. | 713/2 |

* cited by examiner

Primary Examiner—Thomas M. Heckler
(74) Attorney, Agent, or Firm—Robert D. Hinchliffe

(57) ABSTRACT

Firmware for a computer system reduces boot time utilizing the multi-tasking capabilities of a processor to perform at least two boot tasks simultaneously. The boot tasks can be divided into groups which are executed in parallel. To accommodate certain boot tasks which must be performed in sequence, the boot tasks can be arranged in groups which are executed sequentially. The tasks within each group are performed simultaneously. The boot time is also reduced by only enumerating hardware if the system hardware has been changed since the previous boot. The firmware determines if hardware has been changed by checking an electrical hardware latch which signals whether the computer case has been opened.

30 Claims, 2 Drawing Sheets

MULTI-TASKING BOOT FIRMWARE

BACKGROUND OF THE INVENTION

1. Field of the Invention

The present invention relates generally to booting computers, and more particularly, to multi-tasking boot firmware for computers.

2. Description of the Related Art

In a personal computer (PC), the main processor (also referred to as the central processing unit ("CPU") or simply "the processor") performs useful tasks by executing program code that is stored in memory. Most PC memory is volatile, i.e., the information stored in the memory is lost when the power is turned off. Therefore, most program code is stored on a nonvolatile storage device such as a fixed disk (i.e., "hard drive"), and then copied into volatile memory such as dynamic random access memory (DRAM) after the PC is powered-up.

Most PCs also include a small amount of system firmware, which is program code that is stored in a nonvolatile memory device such as read-only memory (ROM). The main processor can run program code directly from ROM as soon as power is applied to the system. In some systems, the system firmware is copied from ROM to DRAM shortly after power-up because program code typically runs faster from DRAM.

The system firmware includes program code known as basic input/output service (BIOS) which performs low-level, hardware-specific tasks. BIOS insulates higher-level software such as the operating system and application programs from the low-level details required to utilize the hardware installed on the system.

The program code in BIOS is generally divided into two types: run time services; and boot code. The run time services are used when the operating system needs to access a hardware device, for example, to write data to a fixed disk. To perform the data transfer, the operating system calls a BIOS routine which handles the details of writing the data to the disk.

The BIOS boot code is used when the system is reset, which usually only happens when the system is powered-up. When a conventional PC is reset, it goes through a boot process to bring the system to a normal operating state. During a typical boot process, a power-on self-test (POST) is performed, hardware devices are configured and initialized, and devices requiring system resources are enumerated. Enumeration is a process in which resources such as memory space, interrupt channels, direct memory access (DMA) channels, and input/output ports are assigned to specific hardware devices. To keep track of these resources, they are listed in one or more resource tables.

In a conventional PC, all of the boot tasks described above are performed sequentially by the BIOS boot code. The BIOS boot code then passes control of the PC to the operating system, which performs some additional boot tasks before the system reaches its normal operating state. The complete boot process typically takes several minutes to complete.

To make personal computers more "appliance-like", the boot time must be reduced significantly so that, even when the computer is off (or appears to be off), it can be powered-up and ready to use almost instantly. It must also be able to boot up quickly enough to respond to real world events such as answering a telephone or displaying new e-mail messages.

Another obstacle to making personal computers more appliance-like is the complexity of changing system hardware. Most PCs are open systems, which means that hardware can be added to or removed from the system. When hardware is added to a conventional PC, the user must manually input configuration information into the system to allow it to utilize the new hardware. This is an awkward and confusing process that requires significant knowledge of computer hardware.

Efforts to reduce the complexity of adding new hardware to a PC overlap with efforts to reduce the boot time of PCs because configuring hardware takes a significant portion of the boot time. For example, initiatives such as "Plug and Play" (or "PnP") and "OnNow", as described below, affect both the boot time of a PC and the procedure for adding new hardware.

Plug and Play is a system of hardware and software that allows a PC to recognize and adapt to hardware changes with little or no intervention by the user. In a Plug and Play PC, some hardware enumeration tasks are performed by the operating system rather than the BIOS boot code.

To allow hardware enumeration to be moved from the BIOS boot code to the operating system, Microsoft Corporation has published the Simple Boot Flag Specification. This specification defines a set of flags in CMOS memory (a type of volatile memory with a battery back-up so that it is essentially nonvolatile). One of the flags is used by the operating system to tell the BIOS whether the operating system is Plug and Play capable. If this flag is activated, the BIOS boot code does not enumerate certain devices that will be enumerated by the operating system. This eliminates the wasted boot time that would occur if the same devices were enumerated first by BIOS, and then again by the operating system. It also helps optimize the use of resources because, if BIOS enumerates a device, it can limit the capability of a Plug and Play operating system to reassign the resources.

The Simple Boot Flag Specification also provides a set of flags for reducing boot time by allowing the operating system to communicate boot failures to the BIOS boot code. This allows the BIOS to skip diagnostic tests if all hardware booted correctly on the previous boot. Even with the Simple Boot Flag Specification, however, there are still occasions on which a full boot process must be executed.

The "OnNow" initiative by Microsoft Corporation is a comprehensive system-wide approach to system and device configuration and power management. One product of the OnNow initiative is the Advanced Configuration and Power Interface (ACPI) specification, version 1.0. The ACPI specification defines different system power states or "sleep" states (S1–S5) in terms of motherboard/CPU/core logic characteristics. ACPI also defines power states (D1–D3) for individual devices in the system. By defining different power states, ACPI allows a PC to power down only partially, thereby eliminating the need to completely reboot and enumerate hardware depending on how "deep" the sleep state.

The ACPI specification has also contributed to the evolution of the Plug and Play specification by defining a system board and BIOS interface that extends the Plug and Play data to provide power management and new configuration capabilities under centralized control of the operating system. Even with ACPI, however, there are still occasions when the system needs to be booted when no previous machine state has been preserved.

In conjunction with the Simple Boot Flag Specification, ACPI, OnNow, etc., it has been suggested that the following boot operations be eliminated so as to reduce boot time: video memory test; serial and parallel port tests; floppy disk test; and tests for hard disk controller or drive type. However, by eliminating these tests, there is a risk that errors associated with these devices will interfere with the operation of the system.

SUMMARY

In one aspect of the present invention, system firmware enumerates hardware only if the hardware has been changed. In another aspect of the preset invention, two or more firmware boot tasks are performed simultaneously while the system is booting. Other embodiments are described and claimed.

DETAILED DESCRIPTION

Figure 1:
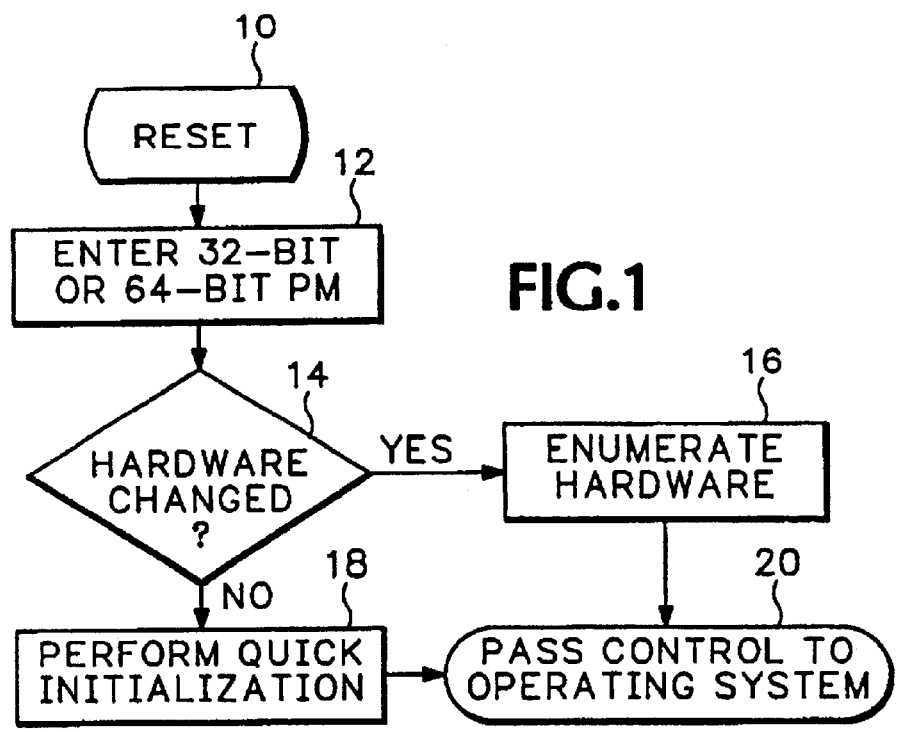
FIG. 1 is a flow diagram of an embodiment of a method for booting a computer in accordance with present invention.

FIG. 1 is a flow diagram of an embodiment of a method for booting a computer using system firmware in accordance with the present invention. The method of FIG. 1 is illustrated in the context of a BIOS boot routine running on a computer system based on an Intel® Pentium® II main processor.

The boot routine begins at 10 when the system is reset. At 12, the main processor is placed in either 32-bit or 64-bit protected mode. At 14, the BIOS boot routine determines if any hardware in the computer has been changed. This can be accomplished by using an electrical hardware latch device as described below with reference to FIG. 4 to indicate whether the case of the computer has been opened since the last boot. If the case has been opened, it can be assumed that hardware has been added to or removed from the system, so the BIOS boot code performs a hardware enumeration process at 16. Otherwise, a quick initialization process is performed at 18. During a quick initialization, the BIOS boot code loads configuration data into configurable devices such as chipsets. The BIOS boot code then passes control of the system to the operating system at 20.

Figure 4:
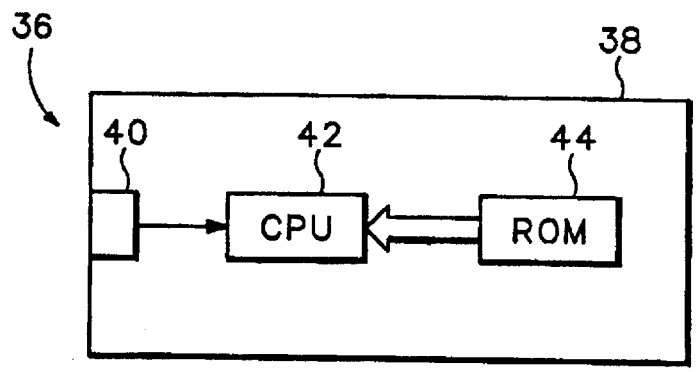
FIG. 4 a block diagram of an embodiment of a computer system having a hardware latch device in accordance with the present invention.

FIG. 4 is a block diagram of an embodiment of a computer system 36 having a hardware latch device in accordance with the present invention. The system shown in FIG. 4 includes a case 38 to which a hardware latch device 40 is mounted. A CPU 42 is disposed within the case and electrically connected to the latch device to receive a signal from the latch device indicating whether the case has been opened. A non-volatile ROM 44 stores BIOS boot code that implements the BIOS boot routine described above with respect to FIG. 1. The code in the ROM 44 causes the CPU to check the signal from the latch device to determine if the case has been opened enumerate hardware only if the case has been opened.

To facilitate booting the system the first time after it is manufactured, a flag in nonvolatile memory can optionally be used to signal the BIOS boot code that the system hardware has not been enumerated yet. For example, when the BIOS program code is programmed into flash memory on the assembly line, a "first boot" flag can be set in the flash memory. When the BIOS boot code checks for hardware changes at 14 in FIG. 1, it checks this flag. If the first boot flag is clear, it proceeds to check the hardware latch. If the first boot flag is set, it clears the flag and proceeds to enumerate the hardware at 16. This check for a first boot flag can be performed in addition to the check to see if the case has been opened, or as an alternative. That is, 14 in FIG. 1 can include either of these checks, or both of them, depending on which features are available on the hardware.

For the method illustrated in FIG. 1 to operate properly when the system is booted after power is removed completely, the enumeration resource tables must be kept in flash memory or other nonvolatile memory. Otherwise, the data in the resource tables will be lost when power is removed from the system. Most Plug and Play computers save the contents of the enumeration resource tables in flash memory.

Alternatively, if the system is capable of entering sleep states, the method of FIG. 1 can be used to boot from a sleep state in which power has been preserved in the memory device holding the enumeration resource tables.

An advantage of the method illustrated in FIG. 1 is that it reduces the time required to boot a computer by eliminating unnecessary enumeration steps. Although the method of FIG. 1 is illustrated in the context of a BIOS boot routine running on a computer system based on an Intel® Pentium® II main processor, the invention is not limited to this implementation. For example, the method of FIG. 1 is also applicable to other system firmware such as add-in card option ROMs. Also, system firmware need not necessarily be stored in nonvolatile memory. For example system firmware from add-in card option ROMs is often transferred to shadow RAM shortly after reset.

Another technique for reducing the boot time for a computer in accordance with the present invention involves utilizing the multi-tasking capabilities of a main processor such as an Intel® Pentium® II processor to speed up the boot process. Many boot tasks involve long time delays during which the processor is simply waiting for hardware to respond to queries and instructions. This is especially true with power-on self-test (POST) tasks such as floppy disk initialization, hard drive initialization, CMOS data accesses, and keyboard initialization. Because prior art BIOS boot code performs these tasks sequentially, substantial time is wasted while the main processor waits for hardware responses. By performing two or more boot tasks simultaneously, the boot time can be reduced.

Figure 2:
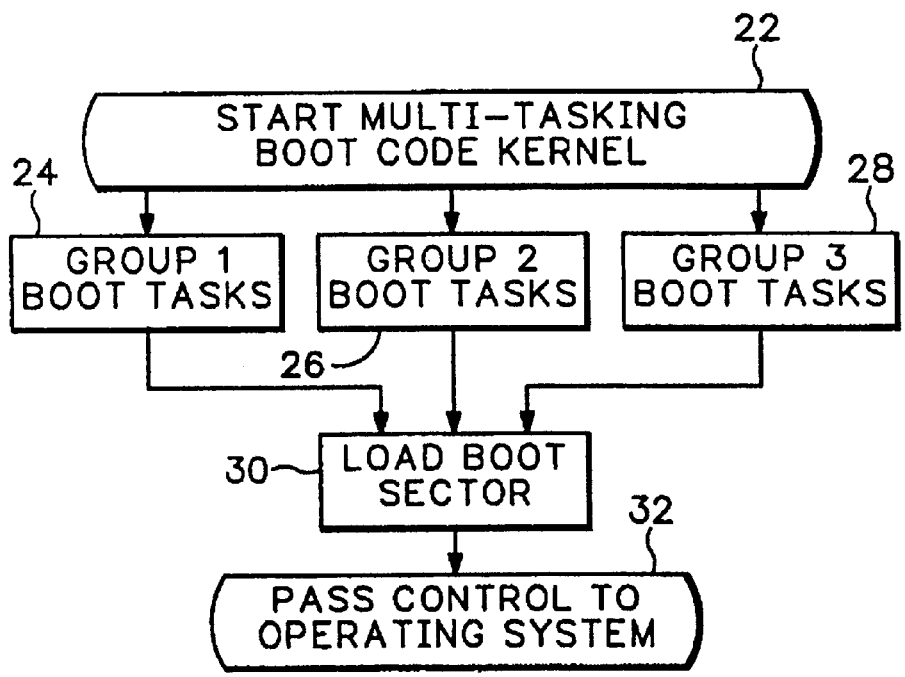
FIG. 2 is a flow diagram of an embodiment of a method for performing multi-tasking boot operations in accordance with the present invention.

FIG. 2, which is a flow diagram of an embodiment of a method for performing multi-tasking boot operations in accordance with the present invention. The method of FIG. 2 is illustrated in the context of a BIOS boot routine running on an Intel® Pentium® II processor.

The method begins at 22 when the BIOS boot program code passes control of the system to the multi-tasking boot kernel. The kernel then performs at least two boot tasks simultaneously using the multi-tasking capabilities of the main processor at 24, 26, and 28. The boot tasks illustrated in FIG. 2 are shown as group 1, group 2 and group 3 at 24, 26, and 28, respectively. The boot tasks are divided into groups for ease of conceptualizing the process. For example, tasks relating to fixed or removable storage devices can be placed in group 1, while tasks relating to serial and parallel ports can be placed in group 2. A group might have only one task.

Although the example in FIG. 2 shows three groups of tasks, any number of groups can execute in parallel (depending on the multi-tasking capabilities of the main processor), as long as at least two boot tasks can be run simultaneously. After the boot tasks are completed at 24, 26, and 28, the boot sector is loaded from the primary boot device at 30, and then control is passed to the operating system at 32.

To achieve the greatest reduction in boot time, it is preferable to execute as many boot tasks as possible simultaneously. However, in many practical implementations, some boot tasks cannot be performed until others are completed. For example, a keyboard controller self-test and reset should be completed before performing a keyboard function test.

Figure 3:
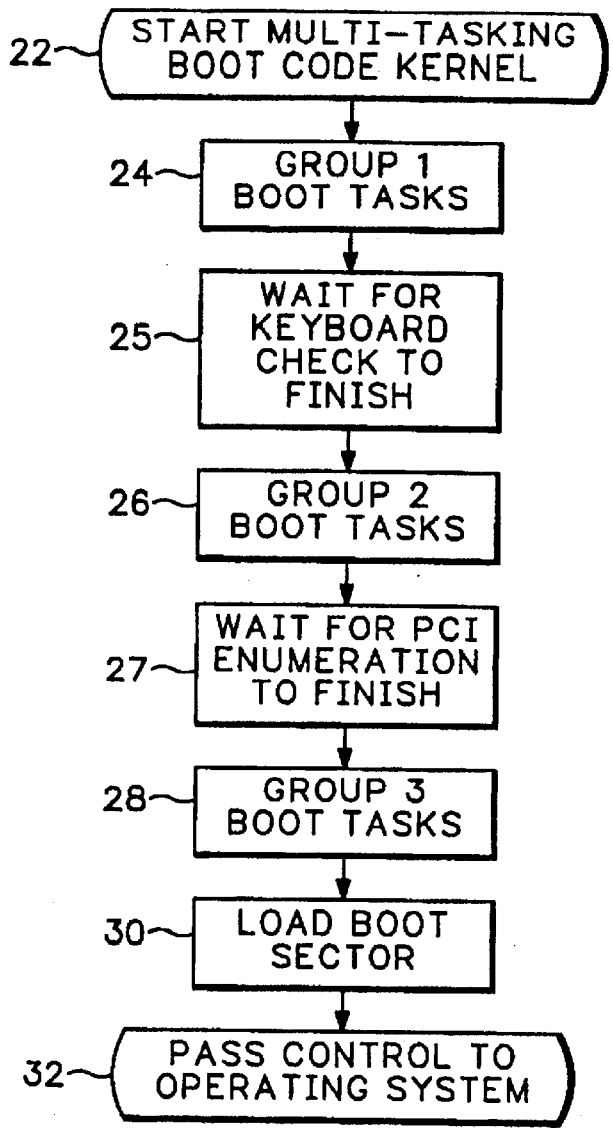
FIG. 3 is a flowagram of an alternative embodiment of a method for performing multi-tasking boot operations in accordance with the present invention.

FIG. 3, is a flow diagram of an alternative embodiment of a method for performing multi-tasking boot operations in accordance with the present invention. The method of FIG. 3 accommodates by the need to perform some boot tasks sequentially while still reducing the total boot time by maintaining a high level of parallelism in the boot process. The method of is similar to that of FIG. 2, but the boot tasks are organized in to groups that are performed sequentially. The tasks within each group/are performed simultaneously.

Referring to FIG. 3, the method begins at 22 when the BIOS boot program code passes control of the system to the multi-tasking boot kernel. At 24, the tasks in the first group are performed simultaneously using the multi-tasking capabilities of the main processor. In a preferred embodiment, the following boot tasks are included in group 1: timer/counter setup; keyboard controller self-test/reset; mouse initialization; CPUID detection/cache control; CMOS range/testing; DMA controller/initialize; and loading interrupt vectors.

Since the keyboard test takes longer than the other tasks in group 1, the processor waits at 25 until the keyboard test is completed, and also checks to make sure the RAM is operating properly.

At 26, the second group of tasks are performed simultaneously. In a preferred embodiment, the following boot tasks are included in group 2: video initialization; floppy drive detection; PCI, video, IDE, bus enumeration; keyboard function test; PnP configuration; external cache initialization; DRAM test/refresh setup; and interrupt controller testing/vector setup. Within the PCI enumeration, the resource allocation, PCI bus enumeration, PCI-IDE initialization, and PCI-video initialization should be performed sequentially.

Since the entire PCI enumeration process takes longer than the other boot tasks in the second group, the processor waits at 27 until the PCI enumeration is completed and the floppy drive is ready.

At 28, the third group of tasks are performed simultaneously. In a preferred embodiment, the following boot tasks are included in group 3: PCI ROM initialization; PnP ROM initialization; and power management initialization.

The boot sector is loaded from the primary boot device at 30, and then control is passed to the operating system at 32.

The grouping of the boot tasks into groups 1, 2 and 3 in FIG. 3 is flexible, and other groupings can be used.

The boot tasks discussed above with respect to groups 1, 2 and 3 are all BIOS POST tasks. However, some BIOS pre-POST tasks are also capable of being performed simultaneously in accordance with the present invention. For example, in the boot block loader, the early chipset initialization and 64 K low memory testing can be implemented with multi-tasking. Other pre-POST boot tasks that can be implemented with multi-tasking include sizing memory and downloading chipset register values.

The multi-tasking boot operations described above with reference to FIGS. 2 and 3 can be used in the hardware enumeration 16 of FIG. 1. However, the method shown in FIG. 1 is not limited to implementations having multi-tasking boot procedures.

A multi-tasking boot routine in accordance with the present invention is preferably implemented as a kernel with a well-defined application program interface (API) for BIOS to initiate and spawn threads, which are the basic software units of execution. (In a multi-tasking hardware environment, each software thread corresponds to a task of hardware execution.) The kernel should also preferably be modular so that it can be easily adapted by any BIOS vendors with minimal modification of existing code. The kernel should also preferably have a small footprint (e.g., less than 8 K) so that it can fit into a ROM shared by other firmware components.

Although the system firmware described above has generally been assumed to be stored in non-volatile ROM, it can also be stored on any suitable computer program product having a computer usable medium for storing computer readable firmware code.

Having described and illustrated the principles of the invention in a preferred embodiment thereof, it should be apparent that the invention can be modified in arrangement and detail without departing from such principles. We claim all modifications and variations coming within the spirit and scope of the following claims.

What is claimed is:

1. A method for booting a computer using system firmware, the method comprising:
   determining if hardware in the computer has been changed; and
   enumerating hardware only if hardware has been changed;
   wherein determining if hardware in the computer as been changed includes checking a first boot flag in nonvolatile memory.

2. A method according to claim 1 wherein determining if hardware in the computer has been changed includes determining if the case of the computer has been opened.

3. A method according to claim 2 wherein determining if the case of the computer has been opened includes checking a hardware latch device.

4. A method according to claim 1 further including performing a quick initialization before passing control of the computer to the operating system if hardware in the computer has not been changed.

5. A method for booting a computer using system firmware, the method comprising:
   determining if hardware in the computer has been changed; and
   enumerating hardware only if hardware has been changed;
   wherein enumerating hardware includes performing two or more firmware boot tasks simultaneously.

6. A method for booting a computer, the method comprising:
   performing two or more firmware boot tasks simultaneously; and
   in response to performing two or more firmware boot tasks simultaneously, booting the computer.

7. A method according to claim 6 further including passing control of the computer to an operating system after the two or more firmware boot tasks are completed.

8. A method according to claim 6 wherein performing two or more firmware boot tasks simultaneously includes performing two or more pre-POST operations simultaneously.

9. A method according to claim 8 wherein performing two or more pre-POST operations simultaneously includes performing two or more of the following simultaneously:
sizing memory;
testing memory;
downloading chipset register values.

10. A method according to claim 6 wherein performing two or more firmware boot tasks simultaneously includes performing two or more POST operations simultaneously.

11. A method according to claim 10 wherein performing two or more POST operations simultaneously includes performing a first group of POST operations simultaneously.

12. A method according to claim 11 wherein the first group of POST operations includes two or more of the following:
timer/counter setup;
keyboard controller self-test/reset;
mouse initialization;
CPUID detection/cache control;
CMOS range/testing;
DMA controller/initialize;
loading interrupt vector.

13. A method according to claim 11 further including performing a second group of POST operations simultaneously after the first group of POST operations are completed.

14. A method according to claim 13 wherein the second group of POST operations includes two or more of the following:
video initialization;
floppy drive detection;
PCI, video, IDE, bus enumeration;
keyboard function test;
PnP configuration;
DRAM test/refresh setup;
external cache initialization;
interrupt controller testing/vector setup.

15. A method according to claim 13 further including performing a third group of POST operations simultaneously after the second group of POST operations are completed.

16. A method according to claim 15 wherein the third group of POST operations includes two or more of the following:
PCI ROM initialization;
PnP ROM initialization;
power management initialization.

17. A computer program product comprising a computer usable medium having computer readable firmware code stored on the medium, wherein the firmware code includes:
computer readable program code that causes the computer to determine if hardware in the computer has been changed; and
computer readable program code that causes the computer to enumerate hardware only if hardware has been changed;
wherein the computer readable program code that causes the computer to determine if hardware in the computer has been changed causes the computer to check a first boot flag in nonvolatile memory.

18. A computer program product according to claim 17 wherein the computer readable program code that causes the computer to determine if hardware in the computer has been changed causes the computer to determine if the case of the computer has been opened.

19. A computer program product according to claim 17 wherein the computer readable program code that causes the computer to determine if hardware in the computer has been changed causes the computer to check a hardware latch.

20. A computer program product comprising a computer usable medium having computer readable firmware code stored on the medium, wherein the firmware code includes:
computer readable program code that causes the computer to determine if hardware in the computer has been changed; and
computer readable program code that causes the computer to enumerate hardware only if hardware has been changed;
wherein the firmware code includes computer readable program code that causes the computer to perform two or more boot tasks simultaneously.

21. A computer program product comprising a computer usable medium having computer readable firmware code stored on the medium, wherein the firmware code includes computer readable program code that causes the computer to boot, wherein causing the computer to boot comprises performing two or more boot tasks simultaneously.

22. A computer program product according to claim 21 wherein the two or more boot tasks include two or more pre-POST operations.

23. A computer program product according to claim 21 wherein the two or more boot tasks include two or more POST operations.

24. A computer program product according to claim 21 wherein the computer readable program code that causes the computer to boot causes the computer to pass control of the computer to an operating system after the two or more boot tasks are completed.

25. A computer program product according to claim 21 wherein the computer readable program code that causes the computer to boot causes the computer to perform a first group of boot tasks simultaneously.

26. A computer program product according to claim 25 wherein the computer readable program code that causes the computer to boot causes the computer to perform a second group of boot tasks simultaneously after the first group of boot tasks are completed.

27. A computer program product according to claim 26 wherein the computer readable program code that causes the computer to boot causes the computer to perform a third group of boot tasks simultaneously after the second group of boot tasks are completed.

28. A computer system comprising:
a case;
a hardware latch coupled to the case, wherein the hardware latch is adapted to indicate to the computer when the case has been opened;
a computer program product disposed within the case, the computer program product comprising a computer usable medium having computer readable firmware code stored on the medium, wherein the firmware code includes:
computer readable program code that causes the computer to check a first boot flag in nonvolatile memory;
computer readable program code that causes the computer to check the latch to determine if the case has been opened; and computer readable program code that causes the computer to enumerate hardware only if the first boot flag is active or the case has been opened.

29. A method for booting a computer, the method comprising:

dividing a plurality of firmware boot tasks into groups;

performing two or more of the plurality of firmware boot tasks simultaneously after dividing the plurality of boot tasks into groups; and booting the computer.

30. A computer program product comprising a computer usable medium having computer readable firmware code stored on the medium, wherein the firmware code includes computer readable program code that causes the computer to:

divide a plurality of firmware boot tasks into groups;

perform two or more of the plurality of firmware boot tasks simultaneously; and boot the computer.

* * * * *

UNITED STATES PATENT AND TRADEMARK OFFICE
CERTIFICATE OF CORRECTION

PATENT NO. : 6,732,264 B1
DATED : May 4, 2004
INVENTOR(S) : Sun et al.

It is certified that error appears in the above-identified patent and that said Letters Patent is hereby corrected as shown below:

Column 3,
Line 18, insert -- the -- before the word "present".
Line 23, delete "flowagram" and insert -- flow diagram --.
Line 26, insert -- is -- after the word "FIG. 4.".

Column 5,
Line 22, insert -- FIG. 3 -- after the words "The method of".
Line 24, delete "group/are" and insert -- group are --.

Signed and Sealed this

Seventh Day of September, 2004

JON W. DUDAS
*Director of the United States Patent and Trademark Office*